(12) United States Patent
Kimura

(10) Patent No.: US 12,475,746 B2
(45) Date of Patent: Nov. 18, 2025

(54) VEHICULAR APPARATUS

(71) Applicant: DENSO CORPORATION, Kariya (JP)

(72) Inventor: Takeshi Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 517 days.

(21) Appl. No.: 17/643,368

(22) Filed: Dec. 8, 2021

(65) Prior Publication Data

US 2022/0101669 A1    Mar. 31, 2022

Related U.S. Application Data

(63) Continuation of application No. PCT/JP2020/020558, filed on May 25, 2020.

(30) Foreign Application Priority Data

Jun. 11, 2019   (JP) ................ 2019-108682

(51) Int. Cl.
*G07C 5/08* (2006.01)
*B60K 35/10* (2024.01)
(Continued)

(52) U.S. Cl.
CPC ............ *G07C 5/0825* (2013.01); *B60K 35/10* (2024.01); *B60K 35/215* (2024.01); *B60K 35/22* (2024.01); *B60K 35/28* (2024.01); *B60K 35/29* (2024.01); *B60K 35/60* (2024.01); *G06F 3/14* (2013.01); *G06T 11/203* (2013.01); *B60K 35/81* (2024.01); *B60K 2360/167* (2024.01)

(58) Field of Classification Search
CPC ....... G07C 5/0825; G06F 3/14; G06T 11/203; G09G 2330/02; G09G 2380/10; B60K 35/00; B60K 35/28; B60K 35/81; B60K 2360/167; B60K 35/22; B60R 16/02
See application file for complete search history.

(56) References Cited

U.S. PATENT DOCUMENTS 9,373,203 B1 *   6/2016   Fields .................... B60K 35/00
2009/0073327 A1 *   3/2009   Watanabe ................ G09G 3/36
348/837

(Continued)

FOREIGN PATENT DOCUMENTS

JP   H04-151340 A      5/1992
JP   2002012058 A *   1/2002
(Continued)

OTHER PUBLICATIONS

U.S. Appl. No. 17/643,351, filed Dec. 8, 2021, Denso Corporation.
U.S. Appl. No. 17/643,351, filed Dec. 8, 2021, Kimura, Takeshi.

*Primary Examiner* — Aniss Chad
*Assistant Examiner* — Christine Nguyen Huynh
(74) *Attorney, Agent, or Firm* — Harness, Dickey & Pierce, P.L.C.

(57) ABSTRACT

A vehicular includes a drawer, an input device and a maintainer. The drawer executes drawing on a display device. The input device receives a signal indicating an operation for stopping a vehicle. The maintainer maintains the drawer at an operating state during a period until the drawing on the display device is not required, in response to that the input device receives the signal indicating the operation for stopping the vehicle.

18 Claims, 4 Drawing Sheets

(51) Int. Cl.
  *B60K 35/215*     (2024.01)
  *B60K 35/22*     (2024.01)
  *B60K 35/28*     (2024.01)
  *B60K 35/29*     (2024.01)
  *B60K 35/60*     (2024.01)
  *B60K 35/81*     (2024.01)
  *G06F 3/14*     (2006.01)
  *G06T 11/20*     (2006.01)

(56) References Cited

U.S. PATENT DOCUMENTS

| | | |
|---|---|---|
| 2013/0096730 A1 | 4/2013 | Numata |
| 2016/0334853 A1* | 11/2016 | Ono .................. B60K 35/00 |
| 2020/0148144 A1 | 5/2020 | Shiomi |

FOREIGN PATENT DOCUMENTS

| | | | |
|---|---|---|---|
| JP | 2006-293732 A | 10/2006 |
| JP | 2009-051437 A | 3/2009 |
| JP | 2013-032044 A | 2/2013 |
| JP | 2013-088454 A | 5/2013 |
| JP | 2017-056830 A | 3/2017 |
| JP | 2019-018844 A | 2/2019 |

* cited by examiner

VEHICULAR APPARATUS

CROSS REFERENCE TO RELATED APPLICATIONS

The present application is a continuation application of International Patent Application No. PCT/JP2020/020558 filed on May 25, 2020, which designated the U.S. and claims the benefit of priority from Japanese Patent Application No. 2019-108682 filed on Jun. 11, 2019. The entire disclosures of all of the above applications are incorporated herein by reference.

TECHNICAL FIELD

The present disclosure relates to a vehicular apparatus.

BACKGROUND

A vehicular apparatus may start an ending sequence for stopping the vehicular apparatus when an ignition is turned off as a trigger.

SUMMARY

The present disclosure describes a vehicular apparatus that includes a drawer, an input device and a maintainer.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
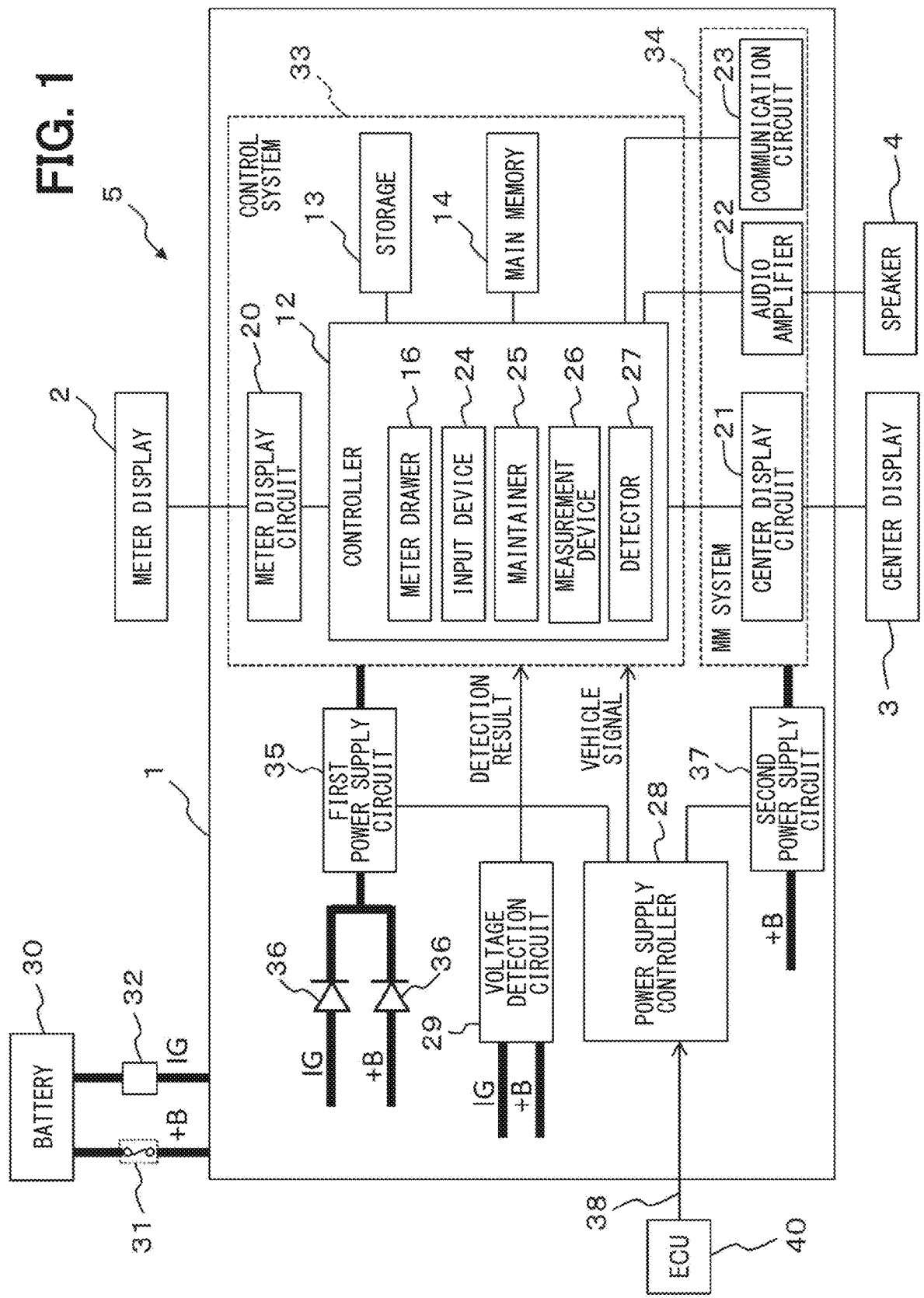
FIG. 1 is a diagram schematically showing a configuration of a vehicular apparatus according to an embodiment.

A vehicular apparatus may integrate a device that displays information related to a vehicle state and a device that displays information of a multimedia system. Hereinafter, a vehicular apparatus integrating multiple devices may also be referred to as an integrated vehicular apparatus. In such an integrated vehicular apparatus, multiple programs are operating in order to realize devices. When an operation for stopping a vehicle by, for example, turning off the ignition is executed, the ending sequence starts and programs unfolded on a main memory are terminated sequentially.

When the vehicle is stopped temporarily, it may be anticipated that the operation for starting the vehicle by turning on the ignition again in a relatively short period before finishing the ending sequence after the operation for stopping the vehicle is executed. In this situation, although one or more programs are terminated, other programs may remain unfinished.

Subsequently, when a starting sequence is started in such a state, the programs are executed in a sequential order different from an ordinary sequential order, and one or more of the programs may not be operated after activation. For example, the display on a display device may not be correctly executed. In a situation where the activation occurs during the ending sequence or in a situation where the ending sequence is completed and then the activation occurs, the time may be required to start the display. Therefore, the display may be delayed.

According to an aspect of the present disclosure, a vehicular apparatus includes a drawer, an input device and a maintainer. The drawer executes drawing on a display device. The input device receives a signal indicating an operation for stopping a vehicle. The maintainer maintains the drawer at an operating state during a period until the drawing on the display device is not required, in response to that the input device receives the signal indicating the operation for stopping the vehicle.

Therefore, even though the operation for stopping the vehicle is executed, it is possible to ensure the execution of the ending of display since the operating state of at least the drawer is continued after the input of the stopping signal, and is possible to reduce the possibility of causing a fault such as the incorrect display of the display device due to the situation where a portion of programs does not operate after the activation.

Hereinafter, an embodiment will be described. As shown in FIG. 1, a vehicular apparatus 1 is connected to display devices such as a meter display 2 and a center display 3. These displays are provided to display necessary information for the vehicle to travel, such as a navigation screen image, a menu screen image, and the like. The vehicular apparatus 1 is connected to a speaker 4. The speaker 4 executes the output of audio guidance during navigation or generation of music. The vehicular apparatus 1 is included in a cockpit system 5 that realizes so-called vehicle infotainment for presenting various information to a user.

Figure 2:
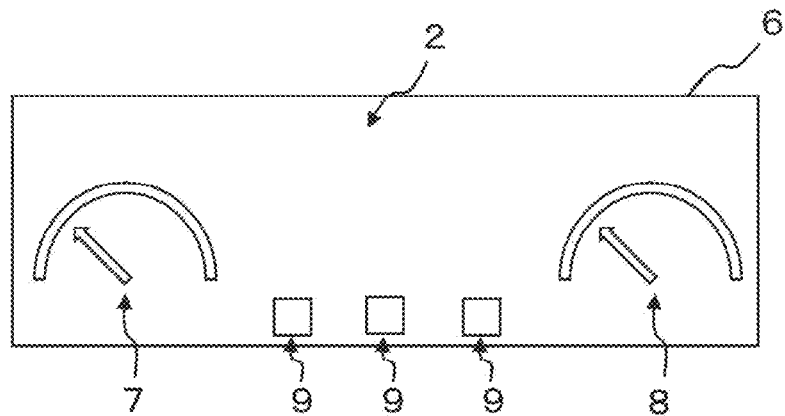
FIG. 2 is a diagram schematically showing a configuration of a meter display.

The meter display 2 is, for example, a liquid crystal display or an organic EL display, and is disposed on a meter panel 6 located in front of a driver. In the present embodiment, as illustrated in FIG. 2, the meter panel 6 may be entirely composed of a display device as a meter display 2, to perform displays in full graphics of, for example, a speedometer 7, a tachometer meter 8, and warning lights 9. The meter display 2 may be located at, for example, the central portion of the meter panel 6, and the speedometer 7, tachometer 8, and a variety of the warning lights 9 may be used.

The meter display 2 mainly displays, for example, vehicle speed, warning, information stipulated by law, information indicating a state of the vehicle such as the remaining amount of fuel and whether or not the seatbelt is fastened, and information indicating traveling state or safety of the vehicle. Hereinafter, these information will be referred to as vehicle information for convenience. Further, the meter display 2 also displays an activation message indicating activation of the vehicle device 1 and a deactivation message indicating deactivation of the vehicular apparatus 1.

Figure 3:
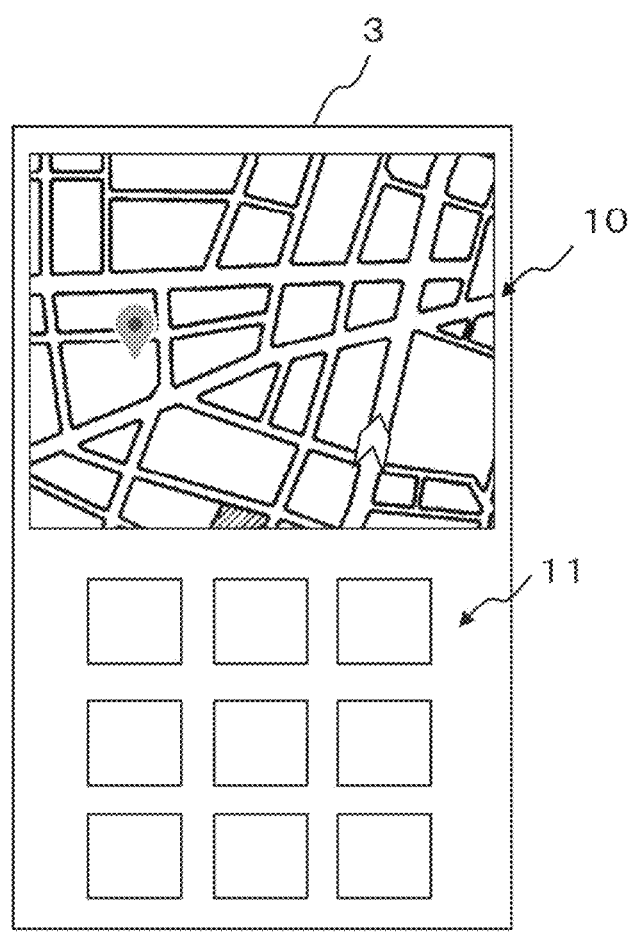
FIG. 3 is a diagram schematically showing a configuration of a center display.

The center display 3 is composed of, for example, a liquid crystal display or an organic EL display, and is arranged to be adjacent to a so-called center console. As shown in FIG. 3, the center display 3 displays, for example, a navigation screen image 10 or a menu screen image 11. The center display 3 can also display a television broadcast, information about a music being played back or the like. That is, the center display 3 mainly displays so-called multimedia information such as the navigation screen 10 and the menu screen 11.

As described above, in the vehicular apparatus 1, multiple devices including a device that displays information indicating the state of the vehicle and a device that displays multimedia information are integrated to provide various information. The vehicular apparatus 1 is an integrated type device that can present information visually or audibly to the driver.

The meter display 2 and the center display 3 can display information by seamlessly linking with one another in the vehicular apparatus 1. For example, the navigation screen 10 can be displayed on the meter display 2, and the vehicle speed can be displayed on the center display 3. However, the number, the arrangement, or the number of the display devices connected to the vehicular apparatus 1 is merely an example, and the disclosure is not limited thereto.

The controller 12 is composed of a so-called microprocessor having a CPU or the like (not shown). The controller 12 controls the vehicular apparatus 1 by executing a computer program stored in a storage device 13, and the storage device 14 may include a non-volatile memory or the like. At this time, each program is read and executed on the main memory 14.

Figure 4:
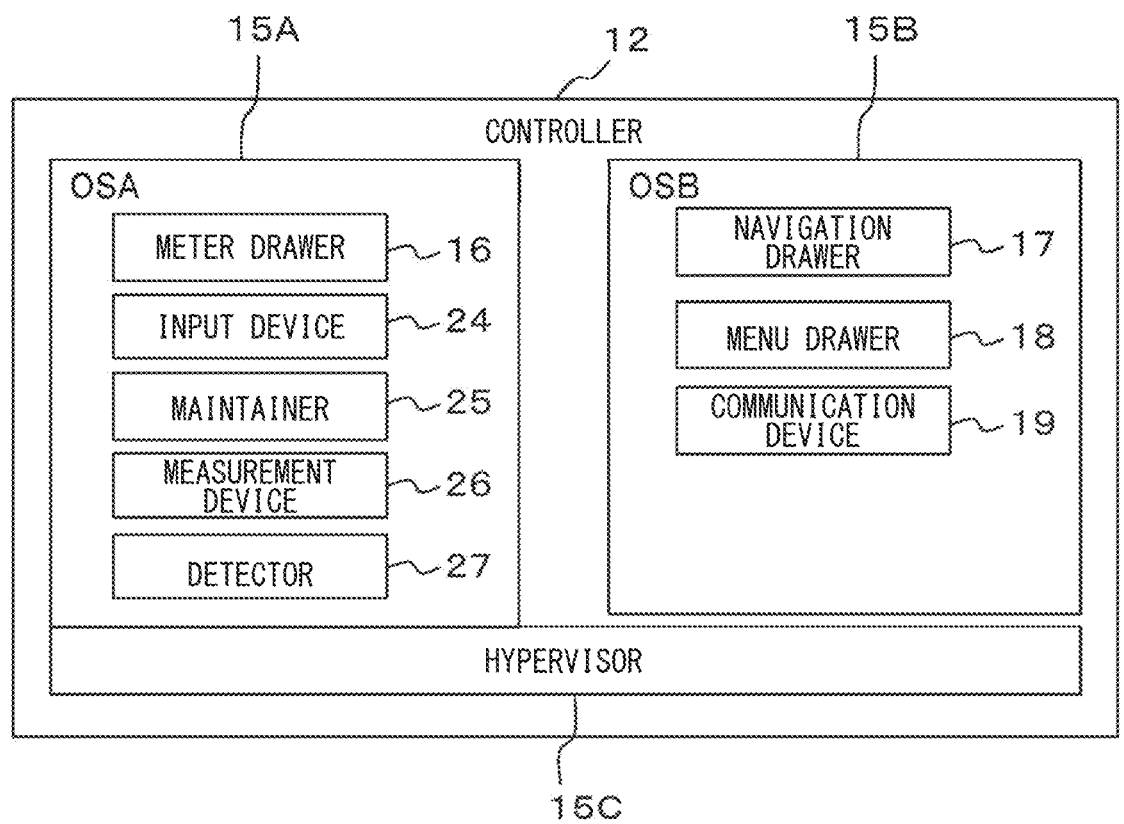
FIG. 4 is a diagram schematically showing a software configuration of a main controller.

As illustrated in FIG. 4, in the controller 12, for example, a virtual environment in which two operating systems 5 operate is constructed. That is, in the vehicular apparatus 1, a plurality of systems are operating on one hardware. Hereinafter, an operating system 15 will be referred to as an OS 15. In the present embodiment, the OS15A and OS15B operate on a hypervisor 15C provided as a function of the OS 15A. The hypervisor 15C may be provided individually, and the OS 15A and OS 15B may be operated on the hypervisor 15C.

The OS 15A is a so-called real-time OS, and includes a functional block that mainly executes a process that requires real-time performance such as a process related to vehicle running or safety, as compared with the OS 15B. In general, such a real-time OS is less likely to cause a fault in the OS 15A itself, and can be considered to have relatively higher stability than a general-purpose OS because it can predict or limit the execution time of an application.

In contrast, the OS 15B is a so-called general-purpose OS. Although its real-time performance is relatively low as compared with the OS 15A, it has an advantage that general-purpose processing such as a multimedia function can be easily executed. Then, the controller 12 controls a variety of devices by appropriately executing a program on each OS 15.

The devices included in the controller 12 are, for example, a meter drawer 16, a navigation drawer 17, a menu drawer 18 and a communication device 19. The meter drawer 16 displays vehicle information on the meter display 2. The menu drawer 18 displays the menu screen 11. The communication device 19 communicates with an external device. These devices are realized by software by a program executed on the controller 12. The devices shown in FIG. 4 are merely examples and the present disclosure is not limited to these examples.

The vehicle information displayed on the meter display 2 relates to the running or safety of the vehicle. Therefore, prompt display and appropriate update of the vehicle information are required. The meter drawer 16 is provided on the OS15A with higher stability. The information drew by the meter drawer 16 is transmitted to the meter display 2 as drawing data in, for example, LVDS format via, for example, a meter display circuit 20.

The meter drawer 16 draws at least one of a starting message and a starting image that indicates the starting of the vehicular apparatus 1 during the starting of the vehicular apparatus 1. The meter drawer 16 draws at least one of a stopping message and a stopping image that indicates the stopping of the vehicular apparatus 1 during the stopping of the vehicular apparatus 1, The starting message or starting image, or the stopping message or stopping image is drawn by, for example, a still image, a motion video or an animation.

On the other hand, for example, the navigation screen 10 or the menu screen 11 may not require much real-time performance as compared with vehicle information, and is multimedia information such as an image, a video, music and audio guidance. Therefore, the navigation drawer 17 and the menu drawer 18 are mounted on the OS15B.

The information displayed by the navigation drawer 17 and the menu screen 18 is transmitted to the center display 3 as drawing data in LVDS format, for example, via the center display circuit 21. The music or audio guidance is output to the speaker 4 as an audio signal through an audio amplifier 22 and reproduced. The navigation drawer 17 and the menu drawer 18 are devices having a relatively low necessity for maintaining the operation when the power supply voltage provided from the battery 30 drops, as compared with the meter drawer 16.

The communication device 19 communicating with the external device is assumed to be connected with a variety of devices; therefore, the communication device 19 is mounted on the OS 15B for executing general-purpose processing. The communication circuit 23 communicates with the external device by a communication method such as USB, Wi-Fi, or Bluetooth (trademark). However, another communication method or multiple communication methods may be adopted.

As shown in FIGS. 1 and 4, the controller 12 includes an input device 24, a maintainer 25 and a measurement device 26, The input device 24 receives a signal indicating an operation for stopping for stopping the vehicle. At this time, an accessory-off signal or an ignition-off signal may be considered as a signal indicating an operation for stopping the vehicle. The input device 24 receives a signal such as an accessory-on signal or an ignition-on signal indicating the operation for starting the activation of the vehicle, and receives a signal indicating, for example, opening of the vehicle door for activating the vehicular apparatus 1.

Hereinafter, the signal indicating the operation for stopping the vehicle may be referred to as a stopping signal, the signal indicating the operation to start the activation of the vehicle may be referred to a starting signal, a signal for activating the vehicular apparatus 1 may be referred to as an activation signal. In the present embodiment, the stopping signal, the starting signal and the activation signal are input through the power supply controller 28 provided separately from the controller 12.

When the input device 24 receives input of the stopping signal, the maintainer 25 maintains the meter drawer 16 at the operation state for executing the drawing required in the stopping of the vehicle, and starts the ending sequence when the predetermined ending conditions are satisfied. In other words, when the input device 24 receives input of the stopping signal, the maintainer 25 maintains the meter drawer 16 at the operation state in a period until the drawing on the meter display 2 as a display device is not required. The maintainer 25 maintains the operation state of a device such as a meter display circuit 20 used when the meter drawer 16 executes the drawing on the meter display 2.

The measurement device 26 uses a timer (not shown) to measure the time elapsed from the input of the stopping signal to the input device 24.

The detector 27 detects whether or not the power supply voltage drops below a predetermined reference value. In the present embodiment, the detector 27 uses the detection result of a voltage detection circuit 29. Specifically, the voltage detection circuit 29 includes, for example, a comparator with hysteresis, and compares the power supply voltage with a predetermined reference voltage.

Subsequently, the voltage detection circuit 29 outputs an L-level signal as the detection result when the power supply voltage drops below the reference voltage, and outputs an H-level signal as the detection result when the power supply voltage is larger than or equal to the reference voltage. The detection result is output to the controller 12, and is detected by the detector 27. The voltage detection circuit 29 may include a step-down circuit or an AD converter, and sends a voltage value to the controller 12 for executing the comparison with the reference voltage at the detector 27.

As illustrated in FIG. 1, the vehicular apparatus 1 mounted on the vehicle is supplied with power from the battery 30. In this case, the vehicular apparatus 1 is supplied with power from a path connected to the battery 30 via the fuse 31 and a path via a switch 32 in collaboration with the ignition. Hereinafter, the power supplied from the battery 30 via the fuse 31 may also be referred to as +B, and the power supplied via the key switch 26b may also be referred to as IG. IG is an abbreviation for Ignition. In FIG. 1, +B and IG are shown by relatively thick solid lines for explanation.

As described above, the integrated vehicular apparatus 1 includes both (i) a device that should maintain operation even though the power supply voltage supplied from the battery 30 drops through, for example, cranking, and (ii) a device that has a relatively low need to maintain operation in the battery drop. Hereinafter, the device for maintaining the operation in the battery drop may be referred to as a device used by a control system, and the device having a relatively low need to maintain operation may be referred to as a device used by an MM system. MM is an abbreviation for Multimedia.

The device in the control system uses a device such as the controller 12, the storage 13, the main memory 14 or the meter display circuit 20 to operate. Hereinafter, the device used by the control-related device is referred to as a control-related device 33. The device used by the MM system uses a device such as the center display circuit 21, the audio amplifier 22 or the communication circuit 23. Hereinafter, the device used by the MM-related device is referred to as a MM-related device 34.

The control-related device 33 is supplied by a power supply from a first power supply circuit 35. The first power supply circuit 35 includes a circuitry structure having countermeasure for a lower voltage so that the power supply can be supplied to the control-related device 33 even though the voltage drops in the power supply voltage provided from the battery 30. Specifically, the first power supply voltage 35 sets the minimum operation voltage capable for power supply to be lower than the minimum value of the voltage assumed at the time of cranking.

The first power supply circuit 35 receives IG and +B at a wired OR circuit through a diode 36. For example, even though the fuse 31 is removed to reduce a dark current during the transportation of a vehicle, it is possible to supply the power supply to the control-related device 33 from the first power supply circuit 35 by turning on the switch 32. Therefore, it is possible to execute the display on the meter display 2. Since the first power supply circuit 35 is for the lower voltage, it is possible to supply the power supply adequate for operating the control-related device 33 normally even though the voltage drops during cranking.

The MM-related device 34 is supplied by the power supply from a second power supply circuit 37. A minimum operation voltage of the second power supply circuit 37 is lower than the rated voltage of the battery 30. The second power supply circuit 44 does not include the low voltage countermeasure circuit configuration that can deal with a low voltage as the first power supply circuit 35. Therefore, in a situation where a large voltage drop occurs in the power supply voltage provided from the battery 30, the power supply to the MM-related device 34 may become unstable. The second power supply circuit 37 receives +B.

The first power supply circuit 35 and the second power supply circuit 37 are controlled by the power supply controller 28. The power supply controller 28 is normally in electrical conduction, and is normally in a sleep state. The power supply controller 29 receives the activation signal for activating the vehicular apparatus 1 from an external ECU 40 connected through a CAN line 38, and starts the control of a variety of power supply circuits. In the present embodiment, the signal indicating the opening of the vehicle door is adopted as the activation signal. The power supply controller 28 also receives the detection result of the power supply voltage at the voltage detection circuit 29.

Next, the operation of the vehicle device 1 having the above configuration will be described.

In the integrated vehicular apparatus 1, a large number of programs are operating in order to realize multiple devices. When the integrated vehicular apparatus 1 receives the stopping signal, the ending sequence starts and the programs are terminated in order. At this time, for example, in a situation where the vehicle is stopped temporarily, it may be anticipated that, after the input of the stopping signal, the starting signal is again input within a relatively short period before the completion of the ending sequence.

In this situation, although one or more programs are terminated, other programs may remain unfinished. Subsequently, when the activation sequence starts in such a state, the programs may be executed in an order different from an ordinary order, one or more programs may not operate after activation. For example, when the ending sequence starts as triggered by turning off the ignition, the display such as a warning to be displayed may be delayed or cannot be executed even in a situation where the vehicle stops.

Figure 5:
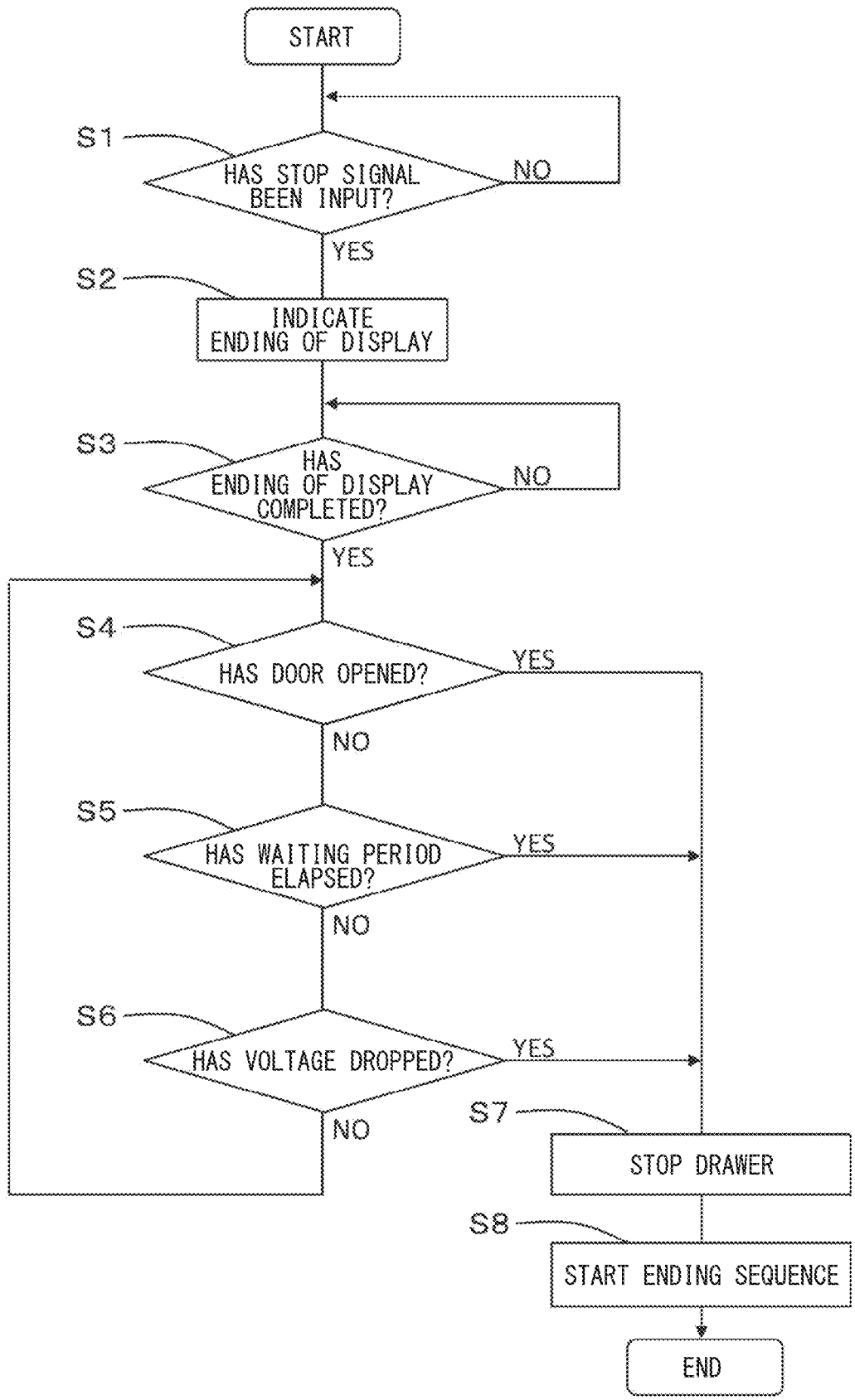
FIG. 5 is a diagram showing a flow of a process executed by a maintainer.

The maintainer 25 is executing the process shown in FIG. 5. In S1 the maintainer 25 determines whether or not the stopping signal has been received. Subsequently, when the maintainer 25 determines that the stopping signal has not been input to the maintainer 25, the maintainer 25 waits for the stopping signal to be input since a negative determination (NO) is made in S1. The stopping signal may assumed to be a signal indicative of turning off the ignition.

When the maintainer 25 determines that the stopping signal has been input to the maintainer 25, the ending of display is indicated to the meter drawer 16 in S2 since an affirmative determination (YES) is made in S1. In the ending of display, a stop message or the drawing of a stop image is drawn at the meter display 2. In the ending of display, the speedometer 7 and the tachometer meter 8 are faded out.

Further, the warning lights 9 are faded out when there is no warning to be notified, and are continuously displayed when there is a warning to be notified. In other words, in the ending of display, one or more processes required for stopping the vehicular apparatus 1 are executed, and a video mute process is executed when there is no information to be presented.

For example, in a state where other information is not displayed by the video mute, the display of items to be noted when using the vehicle next time, such as the display of lower amount of the fuel, is temporarily displayed. As a result, the user's attention can be drawn so that the convenience can be enhanced.

Subsequently, the maintainer 25 determines whether or not the ending of display has been completed in S3. Subsequently, when the maintainer 25 determines that the ending of display has not been completed, the maintainer 25 waits for the ending of display to be completed since the negative determination (NO) is made in S3. In other words, the maintainer 25 maintains the meter drawer 16 to be at the operating state.

When the maintainer 25 determines that the ending of display has been completed, the maintainer 25 determines whether one or more predetermined ending conditions have been satisfied since the affirmative determination (YES) is made in S3. The predetermined ending conditions are used for determining that the operation of the meter drawer 16 may be stopped. In the present embodiment, the following three conditions are set for the ending conditions.

The first ending condition is a condition such that the signal indicating the opening of the door is input after the stopping signal is input. This is because if the door is opened after the stopping signal has been input, it is considered that the user got out from the vehicle. In this case, it is considered that there is a little concern even though the meter drawer 16 and the vehicular apparatus 1 have been stopped. In other words, the vehicular apparatus 1 maintains the meter drawer 16 at the operating state during a period from the input of the stopping signal unto the signal indicating the opening of the door is input.

The second ending condition is a condition that the time measured by the measurement device 26 exceeds a predetermined waiting time after the input of the stopping signal. This is because if other operation is not executed after the elapse of a certain period after the input of the stopping signal, it is considered that it is unlikely to use the vehicular apparatus 1 and there is a little concern even if the meter drawer 16 and the vehicular apparatus 1 are stopped. In the present embodiment, as an example, the waiting time is set to three minutes. However, the waiting time can be appropriately set or modified. In other words, the vehicular apparatus 1 maintains the meter drawer 16 at the operating state during a period from the input of the stopping signal until the power supply voltage drops below the reference voltage.

The third ending condition is a condition such that the detector 27 detects that the power supply voltage drops below the predetermined reference voltage, in other words, the voltage drop after the input of the stopping signal. This is because when the voltage drops, the operation of the vehicular apparatus 1 is likely to have a fault, and it is considered that the user may feel inconvenience when the meter drawer 16 and the vehicular apparatus 1 are continuously in operation under such an unstable state. In other words, it is considered that the meter drawer 16 is correctly in operation during a period until the power supply voltage drops below the reference voltage after the input of the stopping signal.

Therefore, the maintainer 25 stops the operation of the meter drawer 16 in a case where the maintainer 25 determines that any one of the ending conditions has been satisfied. In other words, the maintainer 25 maintains the meter drawer 16 at the operating state until any one of the ending condition has been satisfied. The maintainer 25 maintains the operation state of a device such as a meter display circuit 20 used when the meter drawer 16 executes the drawing on the meter display 2.

In particular, the maintainer 25 determines whether or not the door has been opened in S4. Subsequently, in a case where the maintainer 25 determines that the door has been opened, the affirmative determination (YES) is made in S4, and the process is shifted to S7 and the operation of the meter drawer 16 is stopped, and then the ending sequence is started and the process is ended in S8.

In a case where the maintainer 25 determines that the door has not been opened, the maintainer 25 determines whether the waiting time has been elapsed in S5 after a negative determination (NO) is made in S4. Subsequently, in a case where the maintainer 25 determines that the waiting time has been elapsed, an affirmative determination (YES) is made in S5, and the process is shifted to S7 and the operation of the meter drawer 16 is stopped, and then the ending sequence is started and the process is ended in S8.

In a case where the maintainer 25 determines that the waiting time has not been elapsed, the maintainer 25 determines whether or not the voltage drops in S6 after the negative determination (NO) is made in S5. In a case where the maintainer 25 determines that the voltage drops, the affirmative determination (YES) is made in S6 and then the process is shifted to S7 and the operation of the meter drawer 16 is stopped. After that, the ending sequence is started and then the process is ended in S8.

In a case where the maintainer 25 determines that the voltage is not dropping, the negative determination (NO) is made in S6, and then the process is shifted to S4 and the determination of the ending condition is repeated. The determination in S3 may be performed in parallel with the determination in S4 to S6. In this case, the determination in S3 may be added to the path through which the affirmative determination (YES) is made from S4 to S6.

The maintainer 25 maintains the meter drawer 16 and the control-related device 33 utilized by the meter drawer 16 at the operation state so that the drawing required during the vehicle stop is executed when the input device 24 receives the input of the stopping signal, and starts the ending sequence to stop the vehicular apparatus 1 in the present embodiment as the ending process as the predetermined ending condition is satisfied.

In other words, when the input device 24 receives the stopping signal, the maintainer 25 stops the vehicular apparatus 1, after the maintainer 25 maintains the meter drawer 16 at the operation state in a period until the drawing on the meter display 2 becomes unnecessary.

According to the embodiment described above, the following effects can be achieved.

The vehicular apparatus 1 includes the meter drawer 16, the input device 24 and the maintainer 25. The meter drawer 16 executes the drawing on the display device. The input device 24 receives input of the stopping signal indicative of the operation for stopping the vehicle. The maintainer 25 maintains the meter drawer 16 at the operating state to execute the drawing required during the stopping of the vehicle when the input device 24 receives the input of the stopping signal, and lifts the operating state of the meter drawer 16 when the predetermined ending condition is met. In other words, when the input device 24 receives the stopping signal, the vehicular apparatus 1 maintains the meter drawer 16 at the operation state in a period until the drawing on the display device becomes unnecessary.

Therefore, even though the operation for stopping the vehicle is executed, it is possible to ensure the execution of the ending of display since the operating state of at least the meter drawer 16 is continued after the input of the stopping signal, and is possible to reduce the possibility of causing a fault such as the incorrect display of the display device due to the situation where a portion of programs does not operate after the activation. Since the operating state of a drawer such as the meter drawer 16 is continued, it is possible to promptly execute the display such as the warning lights, and it is possible to prevent or suppress the delay of the display.

The vehicular apparatus 1 assumes or regards the meter display 2 as the display device. As described above, the meter display 2 often displays the information related to the travelling or safety of the vehicle. Additionally, it is considered that, for example, legal warnings are displayed at the meter display 2. Therefore, it is possible to prevent a situation where the legal warnings cannot be displayed, by maintaining the meter drawer 16 to be at the operating state to execute the drawing on the meter display 2.

At this time, in a state where other information is not displayed by the video mute, the display of items to be noted when using the vehicle next time, such as the display of lower amount of the fuel, is temporarily displayed. As a result, the user's attention can be drawn so that the convenience can be enhanced.

In the vehicular apparatus 1, the input device 24 receives the input of the signal indicative of the opening of door, and the maintainer 25 receives the input of the stopping signal indicative of the operation for stopping the vehicle and determines that the ending condition is satisfied, after the input of the stopping signal indicative of the operation for stopping the vehicle. In other words, the vehicular apparatus 1 maintains the meter drawer 16 at the operating state during a period from the input of the stopping signal until the signal indicating the opening of the door is input.

In a case where the signal indicative of the opening of the door is input after the input of the stopping signal, it is assumed that the user who stops the vehicle gets off from the vehicle. It can be considered that the display on the display device becomes unnecessary in a case where the user gets off from the vehicle. Therefore, it is possible to ensure the execution of the ending of display by maintaining the meter drawer 16 at the operating state until the input of the signal indicative of the opening of door, and it is possible to reduce the fault by stopping the operation of the meter drawer 16 at the time of the input of the signal indicative of the opening of door.

The vehicular apparatus 1 includes the measurement device 26 for measuring the time, and the maintainer 25 determines that the ending condition is satisfied when the time measured by the measurement device 26 exceeds the predetermined waiting time after the input of the stopping signal. In other words, the vehicular apparatus 1 maintains the meter drawer 16 at the operating state during a period from the input of the stopping signal until the elapse of the waiting time.

In a case of exceeding the waiting time after the input of the stopping signal, it is expected that the user does not immediately start the vehicle. In this case, it can be considered that it becomes unnecessary to execute the display at the display device in this case. Therefore, it is possible to ensure the execution of the ending of display by maintaining the meter drawer 16 at the operating state until the elapse of the waiting time, and it is possible to reduce the possibility of causing the fault by stopping the meter drawer 16 after the elapse of the waiting time.

The vehicular apparatus 1 includes the detector 27 for detecting whether or not the power supply voltage drops below the predetermined reference value. The maintainer 25 determines that the ending condition is satisfied when the detector 27 detects that the power supply voltage drops below the predetermined reference voltage, after the input of the stopping signal. In other words, the vehicular apparatus 1 maintains the meter drawer 16 at the operating state during a period from the input of the stopping signal until the power supply voltage drops below the reference voltage.

In a case where the power supply voltage drops below the reference voltage, the fault is likely to occur in the operation of the vehicular apparatus 1. If the operation of the meter drawer 16 and the vehicular apparatus 1 is continued under such an unstable state, it is likely to cause a fault. In other words, it is considered that the meter drawer 16 is correctly in operation during a period until the power supply voltage drops below the reference voltage after the input of the stopping signal. Therefore, it is possible to execute the ending of display by maintaining the meter drawer 16 at the operating state until the power supply voltage drops below the reference voltage, and it is possible to reduce the possibility of having the fault by stopping the operation of the meter drawer 16 when the power supply voltage drops below the reference voltage.

The vehicular apparatus 1 draws at least one of the ending message indicating the stopping of the vehicular apparatus 1 and an image indicating the stopping of the vehicular apparatus 1, when the stopping signal is input. As a result, it is possible to notify the user visually that the vehicular apparatus 1 stops and the fault does not occur, in other words, the operation of the vehicular apparatus 1 correctly ends.

In the vehicular apparatus 1, the maintainer 25 includes a device such as the control-related device 33 that is used when the meter drawer 16 executes the drawing on the display device to maintain the operating state. For example, it is possible to prevent a fault that the meter display circuit 20 does not operate and cannot execute the display.

The present embodiment describes the maintenance of the operation of the meter drawer 16. When the input device receives the input of the stopping signal, it is also possible to maintain functional devices in the control system and the control-related device 33 through the maintainer 25, during a period until the drawing on the meter display 2 becomes unnecessary.

Similarly, it is possible to maintain the functional devices in the control system and the control-related device 33 to execute the drawing necessary during the stopping of the vehicle, and it is possible to start the ending process when the ending conditions described in the present embodiment are satisfied.

The present embodiment describes that the ending sequence is started when the ending conditions are satisfied. It is also possible to start the ending sequence after waiting the signal input through the CAN line 38 to be at the off level. The signal is a continuation request signal for continuing the operation of the vehicular apparatus 1.

The present embodiment describes the assumption of the signal indicative of turning off the ignition as the stopping signal. However, it is possible to adopt a signal indicative of turning off an accessory. In this case, it is possible to modify the processing content with the ending of display in a case where the signal indicative of turning off the ignition as in the present embodiment is input and in a case where the signal indicative of turning off the accessory is input.

For example, in a case where the signal indicative of turning off the accessory is used, it is possible to, for example, display the ending message or ending image at the center display 3, mute the video after these displays, store a diagnostic code recorded on the main memory 14 during operation into the storage 13, cut off Bluetooth or Wi-Fi communication and maintain the backup data in the storage 13 during the ending of display.

In this case, in the process shown in FIG. 5, S1 determines whether or not the signal indicative of turning off the accessory has been input, determine whether or not the ending of display at the center display 3 has been completed, and stops the operation of the navigation drawer 17 and the menu drawer 18 when the ending conditions are satisfied. In a case where the navigation drawer 17 and the menu drawer are maintained at the operating state, a device such as the center display circuit 21 may also be maintained at the operating state. It is also possible to execute a process based on the stopping signal described in the embodiment after executing a process based on the signal indicative of turning off the accessory.

The present embodiment describes that the detection of voltage drop is regarded as the ending condition. It is possible to execute a process for avoiding the fault caused by the voltage drop such as restricting the operation of the audio amplifier 22 and the operation of a functional device using the audio amplifier 22. In other words, the voltage detection circuit 29 may be used not only for determining the ending condition but also for preventing the fault during the ordinary operation.

Although the present disclosure has been described in accordance with the examples, it is to be understood that the disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

The controller and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control unit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be performed by the computer.

The process of the flowchart or the flowchart described in this application includes a plurality of sections, and each section is expressed as, for example, S1 Each section may be divided into several subsections, while several sections may be combined into one section. Furthermore, each section thus configured may be referred to as a device, module, or means.

What is claimed is:

1. A vehicular apparatus comprising:
   a drawer configured to execute drawing on a display device of a vehicle;
   an input device configured to receive a stop signal indicating an operation for stopping the vehicle;
   a plurality of functional devices including
      a first functional device configured to display information related to a state of the vehicle on the display device, and
      a second functional device configured to display information of a multimedia system; and
   a maintainer configured to
      maintain the drawer at an operating state and control the drawer to execute on the display device display of a message related to ending of display, warning information, and notice information to be noted for next usage of the vehicle during a period until a continuation request signal becoming an off level, even after the input device receives the stop signal, the continuation request signal being a signal for controlling the vehicular apparatus to continue an operation including the display of the message, the warning information, and the notice information, and
      start an ending sequence for sequentially ending the functional devices to stop the vehicular apparatus in response to the continuation request signal becoming the off level.

2. The vehicular apparatus according to claim 1, wherein the display device is a meter display.

3. The vehicular apparatus according to claim 1, wherein the input device is further configured to receive a signal indicating opening of a door of the vehicle, and wherein the maintainer is further configured to maintain the drawer at the operating state during a period until the input device receives the signal indicating the opening of the door, after the input device receives the stop signal.

4. The vehicular apparatus according to claim 1, further comprising:
   a measurement device configured to measure a time, wherein the maintainer is further configured to maintain the drawer at the operating state during a period until the time measured by the measurement device exceeds a predetermined waiting time, after the input device receives the stop signal.

5. The vehicular apparatus according to claim 1, further comprising:
   a detector configured to detect whether or not a power supply voltage drops below a predetermined reference voltage,
   wherein the maintainer is further configured to maintain the drawer at the operating state during a period until the detector detects that the power supply voltage drops below the predetermined reference voltage, after the input device receives the stop signal.

6. The vehicular apparatus according to claim 1, wherein the drawer is further configured to draw at least one of a message indicating stop of the vehicular apparatus or an image indicating the stop of the vehicular apparatus, in response to that the input device receives the stop signal.

7. The vehicular apparatus according to claim 1, further comprising:
   a device configured to be used when the drawer executes the drawing on the display device, wherein the maintainer is further configured to maintain the device at an operating state.

8. The vehicular apparatus according to claim 7, wherein the device is a meter display circuit.

9. The vehicular apparatus according to claim 1, wherein the stop signal indicating the operation for stopping the vehicle is a signal for turning off an accessory of the vehicle.

10. The vehicular apparatus according to claim 1, wherein:
    the first functional device is further configured to be operated on a first operating system being a real-time system;
    the second functional device is further configured to be operated on a second operating system being a general-purpose system; and
    each of the first operating system and the second operating system is configured to be operated in a virtual environment.

11. The vehicular apparatus according to claim 10, further comprising:
    a controller having a processor configured to cause the real-time system and the general-purpose system to execute an operation, wherein
    the display device is a plurality of display devices including a center display and a meter display of the vehicle,
    the general-purpose system is configured to execute displaying on the center display information of a multimedia system of the vehicle, by controlling a center display circuit of the vehicle, and
    the real-time system is configured to execute displaying on the meter display information related to a state of the vehicle, by controlling a meter display circuit of the vehicle.

12. The vehicular apparatus according to claim 1, wherein the maintainer is further configured to end the operating state of the drawer by starting the ending sequence.

13. The vehicular apparatus according to claim 1, wherein the notice information includes information indicating that a remaining amount of fuel is low.

14. The vehicular apparatus according to claim 1, wherein the warning information includes information stipulated by law.

15. The vehicular apparatus according to claim 1, wherein the display device is a meter display of the vehicle, and a speedometer or a tachometer in the meter display fades out, on a condition that the meter display displays the message related to the ending of display.

16. The vehicular apparatus according to claim 1, wherein the warning information indicates whether a seatbelt of the vehicle is fastened.

17. The vehicular apparatus according to claim 1, wherein the continuation request signal is a signal that is transmitted from an external ECU via a CAN line of the vehicle.

18. A vehicular apparatus comprising:
    a processor and a memory that stores instructions configured to, when executed by the processor, cause the processor to:
        execute drawing on a display device of a vehicle;
        receive a stop signal indicating an operation for stopping the vehicle;
        execute a plurality of functions including a first function for displaying information related to a state of the vehicle on the display device and a second function for displaying information of a multimedia system;
        maintain the processor at an operating state and execute on the display device display of a message related to ending of display, warning information, and notice information to be noted for next usage of the vehicle during a period until a continuation request signal becoming the off level, in response to that the processor receives the stop signal, the continuation request signal being a signal for controlling the vehicular apparatus to continue an operation including the display of the message, the warning information, and the notice information; and
        start an ending sequence for sequentially ending the functions to stop the processor in response to the continuation request signal becoming the off level.

* * * * *